United States Patent [19]
Steuerle et al.

[11] Patent Number: 5,977,293
[45] Date of Patent: Nov. 2, 1999

[54] PROCESS FOR CONTINUOUS PREPARATION OF HOMOPOLYMERS OF ETHYLENEIMINE

[75] Inventors: Ulrich Steuerle; Wolfgang Reuther, both of Heidelberg; Wolfgang Harder, Weinheim, all of Germany

[73] Assignee: BASF Aktiengesellschaft, Ludwigshafen, Germany

[21] Appl. No.: 09/077,877

[22] Filed: Jun. 8, 1998

[30] Foreign Application Priority Data

Dec. 8, 1995 [DE] Germany .............. 195 45 874

[51] Int. Cl.[6] .................................... C08G 73/04
[52] U.S. Cl. ................................. 528/424; 526/64
[58] Field of Search ................. 526/64; 528/424

[56] References Cited

U.S. PATENT DOCUMENTS

| | | | |
|---|---|---|---|
| 2,182,306 | 12/1939 | Ulrich et al. .............................. | 548/967 |
| 3,203,910 | 8/1965 | Wilson ..................................... | 528/424 |
| 4,032,480 | 6/1977 | Zhuk et al. .............................. | 528/424 |

OTHER PUBLICATIONS

I. M. Kosheleva, et al., pp. 1536 to 1541, "Some Properties and the Structure of High–Molecular Polyethylenimine", 1971.

G. Scherr, et al., Kirk–Othmer Encyclopedia of Chemical Technology, Fourth Edition, vol. 14, pp. 1 to 40, "Imines, Cyclic", 1995.

T. St. Pierre, et al., J. Macromol. Sci.–Chem., vol. A22, No. 5–7, pp. 877 to 887, "$^{13}$C–NMR Analysis of Branched Polyethyleneimine", 1985.

T. St. Pierre, et al., ACS Polym. Prepr., vol. 22, pp. 128 and 129, "Carbon–13 NMR Analysis of Polyethyleniemine", 1981.

P. A. Gembitski, et al., Vysokomol. Soedin., vol. A20, No. 7, pp. 1505 to 1510, 1978.

*Primary Examiner*—Fred Teskin
*Attorney, Agent, or Firm*—Oblon, Spivak, McClelland, Maier & Neustadt, P.C.

[57] ABSTRACT

A process for the continuous preparation of homopolymers of ethyleneimine by polymerization of ethyleneimine in a solvent in the presence of catalysts at temperatures of at least 80° C., in homogeneous liquid phase in a tubular reactor in which the ratio of length to internal diameter is at least 5:1. There are obtained polyethyleneimines having a content of secondary nitrogen atoms of more than 40 to 60% and molecular weight distribution $M_w/M_n$ of from 1.5:1 to 3:1.

9 Claims, No Drawings

PROCESS FOR CONTINUOUS PREPARATION OF HOMOPOLYMERS OF ETHYLENEIMINE

DESCRIPTION

The invention relates to a process for the continuous preparation of homopolymers of ethyleneimine by polymerization of ethyleneimine in a solvent in the presence of catalysts at temperatures of at least 80° C.

Polyethyleneimine is prepared by polymerization of ethyleneimine in the presence of acids, Lewis acids, or haloalkanes, cf for example U.S. Pat. No. 2,182,306 and U.S. Pat. No. 3,203,910. The polymerization may be carried out for example in a batch process in which water and 1,2-dichloroethane as catalyst are placed in a reaction vessel, the mixture is heated to a temperature of from 70 to 100° C. and ethyleneimine is continuously added with stirring of the reaction mixture. The polymerization is carried out at temperatures ranging from 70 to 100° C.

The survey articles Izv. Akad. Nauk. SR, Seriya Khimicheskaya, No. 8, 1636 to 1642, (1971) and Kirk-Othmer Encyclopedia of Chemical Technology, 4th Edition, Vol. 14, 2 to 40, (1995) give summaries of manufacturing methods for polyethyleneimine. In the polymerization of ethyleneimine in aqueous solution polyethyleneimines are formed which contain primary, secondary and tertiary nitrogen atoms. Precise determination of the degree of branching of polyethyleneimines by titration with acids is not possible, because approximately only two-thirds of the total nitrogen of the polyethyleneimine are measured. The content of primary, secondary, and tertiary nitrogen atoms in polyethyleneimines is thus reliably ascertained by the use of quantitative $^{13}$C-NMR spectroscopy, cf T. St. Pierre and M. Geckle, J. Macromol. Sci.-Chem., A22, 877 to 887, (1985) and ACS Polym. Prepr. Vol. 22, 128, (1981). According to such investigations commercially available polyethyleneimine, PEi-18 sold by Dow Chemical Company, contains 38% of primary, 36% of secondary and 26% of tertiary nitrogen atoms. The content of secondary nitrogen atoms may be utilized as a measure of the relative change in the linearity of polyethyleneimine prepared under various reaction conditions. Thus for example linear polyethyleneimine showing no branching apart from the two end groups, possesses only secondary nitrogen atoms.

Polyethyleneimines having increased linearity may be advantageous for industrial applications. If for example ethyleneimine is polymerized at low temperatures in aqueous solution, eg at temperatures ranging from 0 to 5° C., there is obtained, after very long reaction times, a mixture of linear and branched-chain polyethyleneimine, cf P. A. Gembitski et al., Vysokomol. Soedin., Band A20, 1505, (1978). If for example ethyleneimine is polymerized in a stirred boiler in aqueous solution at a temperature of 50° C., the resulting content of secondary nitrogen atoms in the polyethyleneimine may be approximately 50%. Due to the long reaction times such low temperatures are unsuitable for affecting said polymerization on an industrial scale. Under the usual industrial conditions, eg when polymerization of aqueous ethyleneimine solutions is carried out at from 90 to 100° C. in ax stirred boiler polyethyleneimines are obtained which contain 35 to 40% of secondary nitrogen atoms. If the polymerization is carried out under pressure at 130° C. in a stirred boiler, the content of secondary nitrogen atoms in the polyethyleneimine is approximately 36%.

It is an object of the present invention to provide a process for the preparation of polyethyleneimines showing increased linearity. The process must exhibit industrially acceptable space-time yields.

This object is achieved in accordance with the present invention with a process for the continuous preparation of homopolymers of ethyleneimine by polymerization of ethyleneimine in a solvent in the presence of catalysts at temperatures of at least 80° C., in which the polymerization is carried out in homogeneous liquid phase in a tubular reactor in which the ratio of length to internal diameter is at least 5:1, preferably at least 20:1 and, in particular, at least 40:1.

The process of the invention produces polyethyleneimines having a content of secondary nitrogen atoms of more than 40 to 60% and showing a $M_w/M_n$ ratio of from 1.5:1 to 3:1. The polyethyleneimines of the invention preferably have a content of secondary nitrogen atoms of from 45 to 55% and a $M_w/M_n$ ratio of from 2.0:1 to 2.3:1.

As known from the prior art, ethyleneimine is polymerized in a solvent in the presence of catalysts. Suitable solvents are those used in the prior art, eg water, alcohols containing from 1 to 20 carbon atoms, dimethylformamide, dimethyl sulfoxide, sulfolane, or mixtures of said solvents. The solvent preferably used in industry is water. The concentration of ethyleneimine in the solution is for example from 1 to 50 and preferably from 5 to 40 wt %.

Suitable catalysts are all of those substances described in the prior art as being useful for the polymerization of ethyleneimine, eg acids such as hydrochloric acid, sulfuric acid, phosphoric acid, organic acids such as formic acid, acetic acid, propionic acid, alkylsulfonic acids, sulfuric acid half esters of alcohols, acid-reacting compounds such as ammonium chloride, other ammonium salts such as reaction products of ethylenediamine with sulfuric acid, eg in a molar ratio of 2:1 or reaction products of ethylenediamine with carbonic acid, eg in a molar ratio of 1:1 or sodium hydrogen sulfate and also Lewis acids such as boron trifluoride. Further suitable catalysts are alkylizing agents such as alkyl halides, eg, methyl chloride, ethyl chloride, propyl chloride, butyl chloride, methylene chloride, chloroform, carbon tetrachloride, 1,2-dichloroethane, tetrachloroethylene and tetrachloroethane. Even small amounts of the catalysts are effective. It is possible to effect polymerization using a ratio of ethyleneimine to catalyst of for example 1000:1 to 3:1. The polymerization is carried out for example at temperatures ranging from 80 to 180° C. and preferably at temperatures of from 90 to 160° C.

According to the invention the polymerization takes place continuously in a tubular reactor in homogeneous liquid phase. There is continuously fed to the tubular reactor a liquid phase prepared by mixing the reactants and the solvent prior to admission to the reactor or at the reactor inlet. For example, water, ethyleneimine and the catalyst can be fed from 3 different metering units to a mixer and thence continuously pumped into the tubular reactor. However, it is also possible to add the necessary amount of catalyst to an aqueous ethyleneimine solution preferably having a temperature in the range of from 0 to 5° C. and then to pump the mixture continuously into the reactor. However, the reaction solution may be metered into the tubular reactor via a static mixer if desired.

The polymerization takes place in homogeneous liquid phase, ie there is to be no possibility of a gas phase reaction taking place. As long as the polymerization temperature is below the boiling temperature of ethyleneimine, the formation of a gas phase is impossible. Another way of ensuring that no gas phase can form during polymerization is to increase the pressure in the tubular reactor. Polymerization is therefore preferably carried out under elevated pressure, eg under a pressure of at least 1.5 bar. The pressure in the tubular reactor is preferably at least 0.5 bar and more preferably at least 1 bar above the boiling pressure of the reaction mixture. For example, when polymerizing an aqueous solution of ethyleneimine at a temperature of 130° C. a pressure of at least from 4 to 7 bar is used. For example, the pressure can attain values in the high pressure range, ie values of up to, eg, 2000 bar, but the apparatus must then be suitably reinforced. Polymerization under such high pressures has virtually no advantage over low pressure polymerization. The pressure can range, for example, from 3 to 200 bar and preferably from 4 to 60 bar.

The polymerization is preferably carried out in a tubular reactor having at least 2 independently heated zones. The polymerization reaction is initiated in the first polymerization zone. In this stage a rapid exothermal reaction produces dimeric ethyleneimine and higher oligomers. Due to the strongly exothermal reaction the reaction mixture present in the first zone of the reactor is usually cooled in order to dispel the heat of polymerization. In the case of a reactor consisting of 2 zones capable of being regulated to different temperatures, the first polymerization zone for example covers from one-tenth to two-thirds of the length of the reaction tube and is immediately followed by the second reaction zone. When continuous polymerization is carried out in such a reactor, the temperature in the first reaction zone is, for example, from 80 to 130° C. and in the adjacent second zone it can be up to 180° C. Preferably the polymerization in the first zone of the tubular reactoris carried out at from 90 to 130° C. and in the second zone at least 10° C. higher. The polymerization temperature in the second reaction zone is preferably from 140 to 160° C. If desired, the tubular reactor can comprise 3, 4, 5 or more independently heated or cooled segments. The reactor can be heated electrically, for example, or with steam or by means of molten salt. At the outlet end of the reactor there is continuously removed an aqueous solution of polyethyleneimine, where the quantity of monomer solution passed into the reactor is the same as the quantity of reaction mixture removed. The said removal of reaction mixture can take place not only continuously but also portionwise, eg at intervals of 2, 10 or 30 seconds, as also applies to the process of filling the tubular reactor. Such operation of the reactor also constitutes a continuous method of operation.

In the process of the invention there are obtained polyethyleneimines having a content of secondary nitrogen atoms of more than 40%. The molar mass of the polyethyleneimines is for example 129 to $12 \times 10^6$ and is preferably in the range of 430 to $1 \times 10^6$.

The polyethyleneimines of the invention have a $M^w/M^n$ ratio of from 1.5:1 to 3:1, preferably from 2.0:1 to 2.3:1. They show a narrower distribution of molecular weights than polyethyleneimines produced by polymerization of ethyleneimine in ax stirred boiler at 50° C. The relative distribution of molecular weights of the polyethyleneimines was ascertained via the $M_w/M_n$ ratio determined by aqueous gel permeation chromatography (GPC) of polyethyleneimines based on a Pullulan standard sold by PL-Gel.

The polyethyleneimines thus prepared can be used for all of the hitherto known applications of polyethyleneimines, eg for the preparation of paper processing chemicals, oil field chemicals, complexing agents, adhesion promotors, flocculating agents, galvanic chemicals, and fuel additives.

EXAMPLES

The $^{13}$C-NMR measurements for determinating the degree of branching of the polyethyleneimines was made according to the specifications given by T. St. Pierre and M. Geckle, AGS Polym. Prepr., Vol. 22, 128, (1981 ) and G. M. Kukovkin et al., Europ. Polym. J., 9, 559, (1973). The polyethyleneimines were diluted with $H_2O$ in 1:1 proportions prior to measurement. During the $^{13}$C-NMR measurements of the polyethyleneimines the relaxation time used to maintain quantitative test conditions between the 90° measuring pulses was set at 10 s. In order to avoid distortions of intensity values by NOE effects, the proton wide band decoupler was only switched on during the acquisition time (inverse-gated).

Example 1

The polymerization was carried out in a tubular reactor of pressure glass, which had a length of 14 m and an internal diameter of 3 mm. The tubular reactor consisted of two independently heated zones, of which the first zone covered two-thirds and the second zone one-third of the length of the tube. In a mixing chamber there was produced a reaction solution cooled to 5° C. by metering a 25% strength aqueous ethyleneimine solution at a rate of 344 g/h (2 mol/h of ethyleneimine) and a catalyst solution of 12 g (0.2 mol) of ethylenediamine and 9.8 g (0.1 mol) of sulfuric acid at a rate of 31 g/h into 288.2 g of water. At the rate at which the reactants were metered to the mixing were they metered from the mixing zone into the reactor. At the outlet end of the reactor the reaction solution was discharged at the same rate. The pressure at the reactor outlet was adjusted to 5 bar. The temperature of the reaction mixture in the first reaction zone was 110° C. and in the second zone it was 140° C. The residence time of the reaction mixture was 16 min. Following the passage of 3 reactor charges to establish steady-state conditions a sample was taken and analyzed. Using $^{13}$C-NMR spectroscopy, a ratio of primary to secondary to tertiary nitrogen atoms of 1:1.78:0.85 was ascertained. The content of secondary nitrogen atoms in the polymer was 49%. The $M_w/M_n$ ratio was 2.2.

Example 2

Example 1 repeated except that in the first reaction zone a temperature of 130° C. was used and in the second reaction zone a temperature of 140° C. was used. There was obtained a polyethyleneimine, in which the ratio of primary to secondary to tertiary nitrogen atoms was 1:1.69:0.81. The content of secondary nitrogen atoms was 48%. The $M_w/M_n$ ratio was 2.0.

Example 3

Example 1 was repeated except that in the first reaction zone a temperature of 90° C. was used and in the second reaction zone a temperature of 120° C. was used and the metering rate of the 25% strength ethyleneimine solution was set to 172 g/h and that of the catalyst solution to 15.5 g/h. The residence time of the reaction mixture in the reactor was thus 32 minutes. There was obtained a polyethyleneimine having a ratio of primary to secondary to tertiary nitrogen atoms of 1:1.77:0.85. The content of secondary nitrogen atoms was 48%. The $M_w/M_n$ ratio was 2.2.

Example 4

Example 1 was repeated except that the temperature in the first heating zone was is adjusted to 130° C. and in the second heating zone to 160° C. and the 25% strength aqueous ethyleneimine solution was metered in at a rate of 172 g/h (1 mol/h of ethyleneimine) and ax catalyst solution of 1.2 g (0.02 mol) of ethylenediamine and 0.88 g (0.02 mol) of carbon dioxide at a rate of 15.5 g/h into 307.9 g of water. The residence time of the reaction mixture in the tubular reactor was 32 minutes. There was obtained a polyethyleneimine in which the ratio of primary to secondary to tertiary nitrogen atoms was 1:1.66:0.83. The content of secondary nitrogen atoms was 48%. The $M_w/M_n$ ratio was 2.3.

Comparative Example 1

In a polymerization vessel of glass having a capacity of 500 mL there were placed 1.2 g (0.02mol) of ethylenediamine, 1.0 g (0.01 mol) of sulfuric acid and 29 g of water. The mixture was subsequently heated. At a temperature of 50° C. there were added, at constant reaction temperature, 86 g (2 mol) of ethyleneimine in 57 g of water over a period of 40 minutes and the reaction mixture was stirred at 50° C. until conversion of the ethyleneimine was complete. The reaction time was 138 hours. The polyethyleneimine had a ratio of primary to secondary to tertiary nitrogen atoms of 1:1.74:0.52. The content of secondary nitrogen atoms was 50%. The $M_w/M_n$ ratio was 3.8.

Comparative Example 2

In a polymerization vessel of glass having a capacity of 500 mL and provided with a stirrer there were placed 1.2 g (0.02 mol) of ethylenediamine, 1.0 g (0.01 mol) of sulfuric acid and 29 g of water. The catalyst solution was heated to a temperature of 90° C. Whilst keeping the reaction temperature at 90° C. there were added 86 g (2 mol) of ethyleneimine in 57 g of water to the initial mixture with stirring and the resulting mixture was stirred for 8 h at 90° C. to complete conversion. There was obtained a polyethyleneimine in which the ratio of primary to secondary to tertiary nitrogen atoms was 1:1.05:0.75. The content of secondary nitrogen atoms in the polymer was 38%.

Comparative Example 3

In a glass autoclave equipped with a stirrer and having a capacity of 100 mL, there were placed 0.35 g (0.0035 mol) of sulfuric acid and 0.42 g (0.007 mol) of ethylenediamine in 10 mL of water. The solution was heated to 130° C. 50.2 g of a 60% strength ethyleneimine solution were metered in whilst the reaction temperature was regulated to 130° C. The reaction mixture was then stirred for another 2 hours at 130° C. There was obtained a polyethyleneimine in which the ratio of primary to secondary to tertiary nitrogen atoms was 1:1.01:0.8. The content of secondary nitrogen atoms was 36%.

We claim:

1. A process for the continuous preparation of homopolymers of ethyleneimine by polymerization of ethyleneimine in a solvent in the presence of catalysts at temperatures of at least 80° C., wherein the polymerization is carried out in homogeneous liquid phase in a tubular reactor in which the ratio of length to internal diameter is at least 5:1.

2. A process as defined in claim 1, wherein the polymerization is carried out in a tubular reactor in which the ratio of length to internal diameter is at least 20:1.

3. A process as defined in claim 1, wherein the polymerization is carried out in a tubular reactor in which the ratio of length to internal diameter is at least 40:1.

4. A process as defined claim 1, wherein the polymerization is carried out under a pressure of at least 1.5 bar.

5. A process as defined claim 1, wherein the polymerization is carried out in a tubular reactor having at least two independently heated zones.

6. A process as defined in claim 5, wherein the polymerization in the first zone of the tubular reactor, to which the reactants are continuously metered, is carried out at temperatures of from 80 to 130° C. and in an adjacent second zone at temperatures of up to 180° C.

7. A process as defined in claim 6, wherein the polymerization in the first zone of the tubular reactor is carried out at from 90 to 130° C. and in the second zone at at least 10° C. higher.

8. A polyethyleneimine whenever produced by a process as defined in any of claim 1, and having a content of secondary nitrogen atoms of more than 40 to 60% and a $M_w/M_n$ ratio of from 1.5:1 to 3:1.

9. A polyethyleneimine as defined in claim 8, which has a content of secondary nitrogen atoms of from 45 to 55% and a $M_w/M_n$ ratio of from 2.0:1 to 2.3:1.

* * * * *